United States Patent [19]

Normandin

[11] 4,310,032
[45] Jan. 12, 1982

[54] APPARATUS FOR MAKING PAPER CLIPS

[75] Inventor: Marcel H. Normandin, Brossard, Canada

[73] Assignee: Dextrous Engineering & Sales Corp., St. Laurent, Canada

[21] Appl. No.: 55,905

[22] Filed: Jul. 9, 1979

[51] Int. Cl.³ .................. B21F 3/00; B21F 11/00; B21F 23/00; B21F 45/18

[52] U.S. Cl. ........................ 140/82; 83/886; 83/887; 140/139; 225/100

[58] Field of Search ............. 140/82, 105, 139; 225/96, 96.5, 100; 83/110, 887, 886; 269/8; 198/636, 597

[56] References Cited

U.S. PATENT DOCUMENTS

| | | | |
|---|---|---|---|
| 1,313,054 | 8/1919 | Berry | 83/886 X |
| 2,471,447 | 5/1949 | Perkins | 225/96 X |
| 2,541,376 | 2/1951 | Nelson | 198/636 X |
| 3,061,919 | 11/1962 | Tack | 269/8 X |
| 3,175,301 | 3/1965 | Duff et al. | 198/597 X |
| 3,508,693 | 4/1970 | Rossi | 225/100 X |
| 3,760,931 | 9/1973 | Buchheit | 198/636 |
| 4,095,498 | 6/1978 | Biggar | 83/887 X |

FOREIGN PATENT DOCUMENTS 400472 8/1924 Fed. Rep. of Germany ........ 140/82
396230 1/1974 U.S.S.R. .................. 269/8

Primary Examiner—Paul A. Bell
Attorney, Agent, or Firm—Fleit & Jacobson

[57] ABSTRACT

An apparatus for making paper clips which includes cutting predetermined lengths of wire by advancing a continuous wire at a predetermined speed to a cutting station. The cutting station includes knife means with the knife having a cutting blade edge for penetrating the wire. Delivery means to engage the wire are provided along the path downstream of the cutting station for advancing the wire into a receiving slot. The receiving slot is provided with a deflecting member at an acute angle to the path of the wire and a magnet. The cut wire is then lifted out of the slot by an elevator platform means, and the wire is engaged by a ramming plate associated with three spindles, each spindle adapted to pass through a respective die member and the die member having spiral bending edges for bending the cut wire about the respective spindles for forming the paper clip.

7 Claims, 16 Drawing Figures

APPARATUS FOR MAKING PAPER CLIPS

BACKGROUND OF THE INVENTION

1. Field of the Invention

The present invention relates to improvements in the manufacture of paper clips, and more particularly, to a method and apparatus for cutting and forming a drawn wire into a paper clip of the trombone type.

2. Description of the Prior Art

There exists today high speed machines for forming trombone-type paper clips in which a continuous length of wire is fed into a die, the wire is cut, and the length of wire so cut is formed by moving it through three sequentially located, hollow, tubular members having curved ramp surfaces adapted to bend and form the length of wire into a trombone shaped paper clip. An example of such an apparatus is illustrated in German Pat. No. 400,472, issued Aug. 8, 1924.

SUMMARY OF THE INVENTION

Such apparatuses have proved successful over the years; however, with ever increasing costs, it is more and more difficult to produce a relatively inexpensive paper clip. Accordingly, it is the aim of the present invention to increase the efficiency and productivity of machines for forming paper clips by increasing the rate at which such paper clips are being produced.

It is an aim of the present invention to provide an improved wire cutting apparatus as part of the paper clip forming machine which will cut predetermined lengths of wires to be formed at high speeds while reducing the occurrence of sharp burrs on the cut ends of the paper clips, thereby reducing the chance of injury while handling such paper clips in use.

It is also an aim of the present invention to provide an improved feeding mechanism for feeding the cut lengths of wire at high speeds into the die and locating said cut wire accurately for succeeding passage through the forming dies.

A construction in accordance with one aspect of the present invention includes means for feeding a continuous wire at a predetermined speed in a given path, means presenting a die surface adjacent the path of the wire, knife means on the opposite side of said path from said die surface adapted to intermittently engage the wire, pressing the wire against the die, and partially severing the wire, the knife means engaging the wire at predetermined lengths along the wire as it passes by the die, the knife means including a cutting blade edge for penetrating the wire and a pair of shoulders spaced from the blade edge a distance less than the thickness of the wire such that the shoulders engage and press the cut edges of the wire, and delivery means engaging the wire along the path downstream of the cutting station.

Another aspect of the present invention includes means delivering the wire into a receiving slot at high speeds, the receiving slot being arranged to align the wire to be passed through a die forming means, a deflecting member in the slot, the surface of the deflecting member being at an acute angle to the path of the wire, and the trailing edge of the deflecting surface being spaced from the opposite wall forming the slot a distance greater than the diameter of the wire, such that as the wire is delivered at high speeds into the slot, the wire hits the deflecting surface and passes through the space between the trailing edge of the deflecting surface and the wall forming the slot at a reduced speed as a result of said deflection, and a magnet located at the closed end of said receiving slot so as to retain the wire and hold it against the magnet surface in a position ready to be passed through the die forming means.

A further aspect of the present invention includes means for lifting the wire out of said receiving slot into a ramming path, three tubular forming dies having spirally curved bending edges, the axis of said forming dies being at right angles to the receiving slot, a ramming member including forwardly projecting pins adapted to pass centrally of the respective tubular forming dies and adapted to engage the cut wire member lifted from the receiving slot into the ramming path, and advance the wire through the forming dies while the forming dies form the wire into a trombone paper clip and the ram being adapted to discharge the formed paper clip from the forming dies.

A method in accordance with one aspect of the present invention includes advancing a continuous wire at a predetermined speed to a cutting station, partially severing the wire at the cutting station while compressing the edges of the wire, withdrawing the wire from the cutting station at a slightly higher speed than it is being advanced to the cutting station causing the wire to be pulled apart as it is being severed.

A method in accordance with a further aspect of the present invention includes advancing a cut wire of a predetermined length at high speeds, discharging it into a receiving station, deflecting the wire in the receiving station so as to reduce its inertia, magnetically attracting the wire to abut the wire at the end of the receiving station so as to properly locate the wire, and lifting the wire into a ramming path.

A method in accordance with still a further aspect of the present invention includes advancing the cut wire in the ramming path through a forming station and bending and forming a first length from one end of the cut wire, bending and forming another length of the wire from the other end of the cut wire and giving it a bending radius greater than the first bending radius and then bending the wire about its mid-section forming a bending radius at the mid-section which is less than the second bending radius, folding said wire so that the first bent radius is within the confines within the plane of the second bent radius and then discharging the so-formed paper clip.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
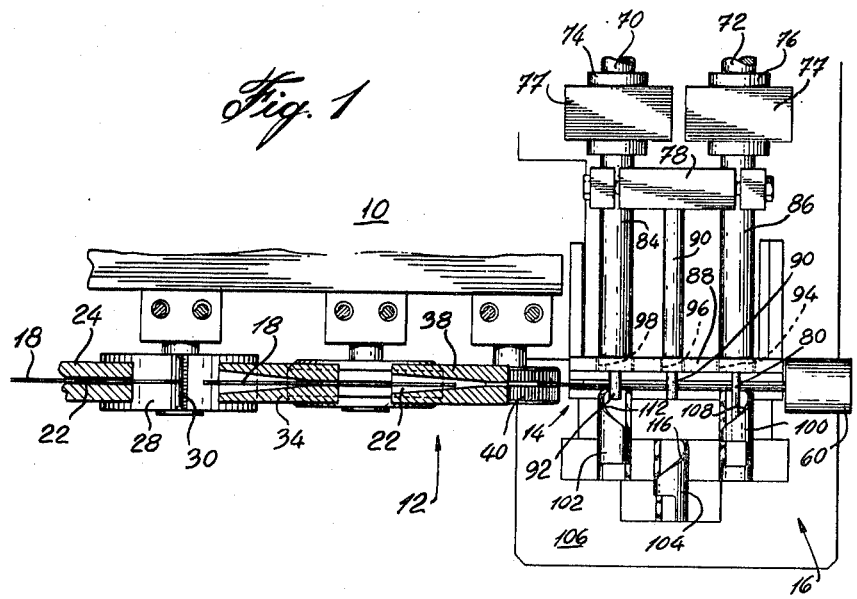
FIG. 1 is a plan view showing an apparatus in accordance with the present invention.
Figures 9, 10, 11:
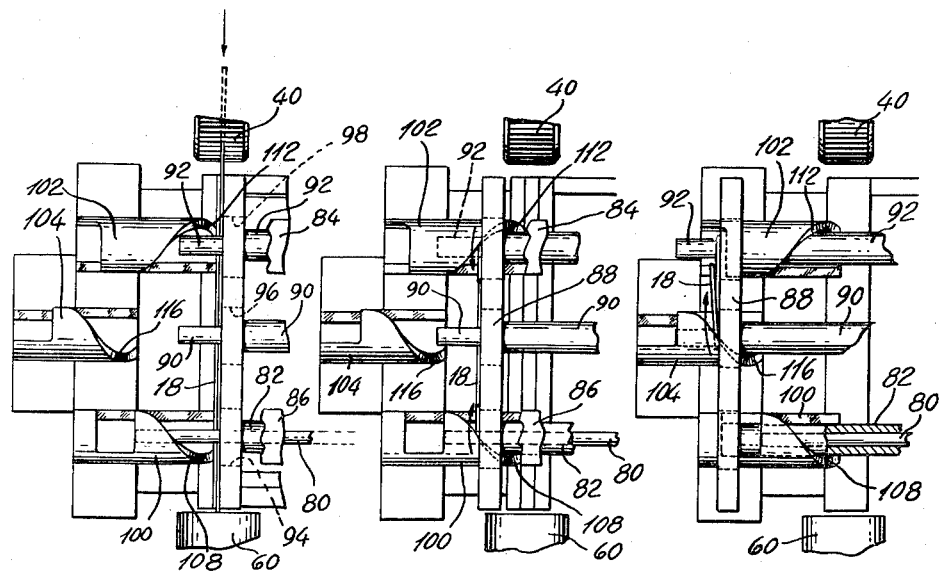
FIG. 9 is a fragmentary top plan view showing a detail of FIG. 1.
FIG. 10 is a fragmentary top plan view showing the detail of FIG. 9 in a different operating position.
FIG. 11 is a fragmentary top plan view showing the detail of FIG. 9 in a different operating position.

Referring now to the drawings and particularly to FIG. 1, there is shown an apparatus for making trombone type paper clips including a housing 10 on which is provided three main stations, namely, a wire cutting station 12, a wire receiving station 14, and a die forming station 16. Reference will be made to the distinct stations in this order. The three stations are mounted on the housing 10 and are actuated by common drive means.

Figure 2:
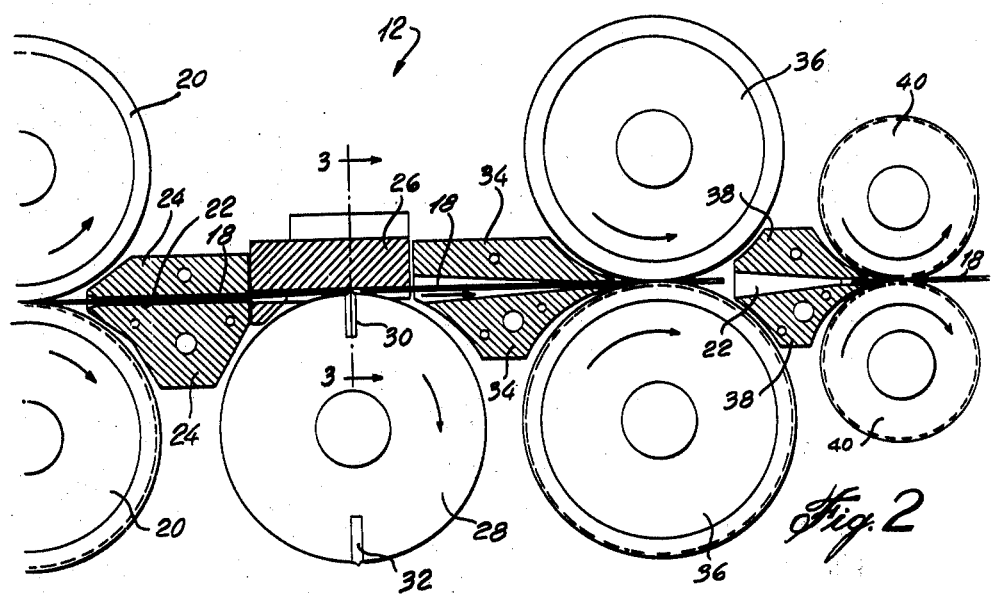
FIG. 2 is a fragmentary view, partially in longitudinal cross-section, of the wire feeding and cutting and discharging section of the apparatus.
Figure 4:
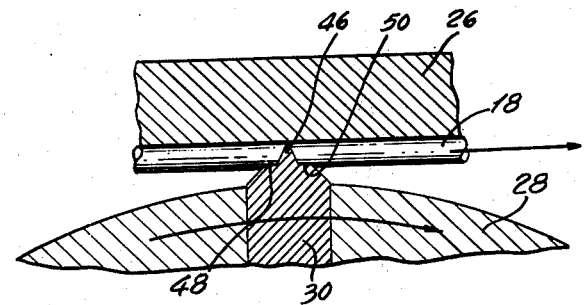
FIG. 4 is an enlarged fragmentary detail view of FIG. 2.
Figure 3:
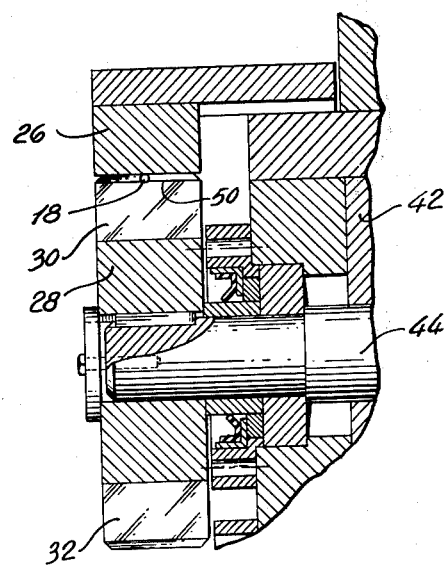
FIG. 3 is a vertical cross-section, taken along line 3—3 of FIG. 2.

Station 12 as shown in FIGS. 2 through 4 includes an unreeling device not shown, feeding a continuous steel wire 18 through feeding wheels 20 which feeds the wire through a guide block 24 at a given predetermined speed. The drive wheels 20 are grooved and engage the wire as shown in FIG. 2 for driving it towards the cutting mechanism. The guide block 24 includes a bore which is flared, enabling the threading of the continuous wire.

Downstream of the guide block 24 is a fixed cutting die member 26 which has a flat surface against which the wire 18 passes in the path 22.

A cutting wheel 28 rotates adjacent the die member 26, and the wheel 28 mounts a pair of diametrically opposed cutting knives 30 and 32. Each cutting knife 30 or 32, as shown in FIG. 4, includes a V-shaped cutting edge 46 and shoulders 48 and 50. The shoulders 48 and 50 are spaced from the cutting edge 46, a distance less than a thickness of a typical wire 18 to be processed.

The cutting wheel 28 is mounted to a shaft 44 rotating on bearings in the frame 42 on the housing 10. Driving wheels 20 are similarly mounted as well as the guide block 24, that is, to the frame 42.

Downstream of the cutting wheel 28 and die member 26 is a guide block 34 having a tapered bore in the path 22 of the wire 18.

Downstream of the guide block 34 is a pair of discharge rollers 36 which may be adapted to rotate at a speed slightly greater than the rotational speed of the feeding rollers 20, but in most cases would move the cut wire at the same speed as the feeding rollers 20. The discharge rollers 36 are similar in construction to the feed rollers 50 and advance the cut wire 18 through the guide block 38 having a tapered bore in the path 22 of the wire 18. Further discharge wheels 40 advance the cut wire 18 at high speed to the receiving station 14. In an operating embodiment, the discharge rollers 40 advance the cut wire 18 at a linear speed 2.6 times the linear speed at which the wire 18 is advanced by rollers 20 and 36.

In operation, the wire 18 is advanced by the feed rollers 20. The cutting knives 30 and 32 on the cutting wheel 28 are indexed such as to correspond to the length of the wire to be cut for forming a predetermined size of the paper clip. The cutting knife 30 engages the wire 18 to sever the wire. Almost simultaneously, the shoulders 48 and 50 below the V-shaped cutting edge engage the edges of the wire which have been severed by the cutting edge 46 pressing any excess material which may have been pushed out of the notch formed by the cutting edge 46. The shoulders 48 and 50 penetrate the wire in the above example by 0.004 inches. This arrangement reduces and almost eliminates the burrs which are normally formed when wire is conventionally cut.

In another test, the rollers 36 were made to turn faster than the rollers 20. The cutting knife 30 only partially severed the wire. A thickness of 0.002 inches was left in a wire having a diameter of 0.036 inches. The discharge rollers 36 are, however, pulling on the wire and stretch it apart. The stretching at the break causes the severed edges to turn inwardly since the material diminishes in cross-section before reaching a point of failure.

Reference is now made to FIGS. 5 through 8. As the cut wire 18 is discharged from the final discharge rollers 40, it enters the receiving station 14 as shown in FIG. 1. The station 14 includes a slot 51 defined by walls 52 and 54. A deflector 56 is provided as an insert in the wall 54 and has a surface at an acute angle to the longitudinal axis of the slot 51 or the direction of the path 22.

At the end of the slot 51 is an end wall formed by a magnet 60.

The bottom of the slot 51 is formed by a platform 58 which is integral with a pedestal 62 which in turn is connected to a piston 64 adjustably mounted to a lift mechanism 66. Although it is not shown, the lift mechanism 66 would be actuated by appropriate leverage and cam mechanism coordinated with the ramming stations, as will be described.

In operation, as the cut wire 18 is discharged at high speed into the receiving station 14 represented by the slot, it will in most instances hit the surface of the deflector 56 which will cause the wire to bounce off the wall 52 and realign itself. The deflection and the bouncing of the wire 18 off the wall 52 will greatly reduce the inertia of the wire 18, thus slowing it down for its eventual immobilization in the slot 51. The magnet 60 is provided such that when the wire 18 finally abuts the end wall, it will not bounce back but will be held by the traction of the magnet so that the wire 18 is aligned and abuts against the end wall.

Figure 7:
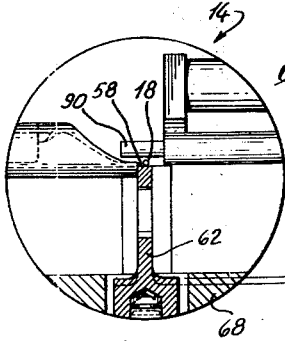
FIG. 7 is an enlarged detail view, similar to FIG. 6, showing the lifting member in a different operating position.
Figure 8:
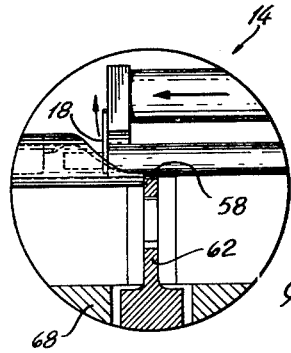
FIG. 8 is a view similar to FIG. 7 and showing the ramming member in a different operating position.
Figure 5:
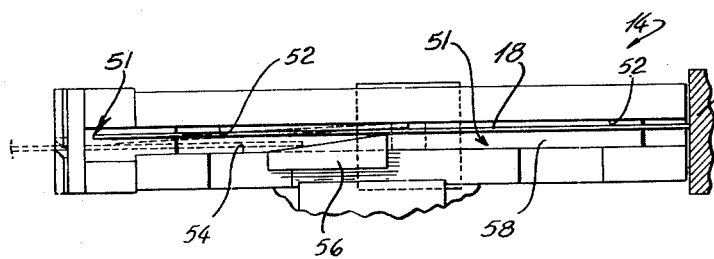
FIG. 5 is a fragmentary top plan view of a detail of the apparatus showing the receiving slot.

As soon as the wire is in its resting position, the lifting mechanism 66 will lift the platform 58 by means of the piston 64 and pedestal 62, thus elevating the wire 18 a short distance, represented by the letter X in FIG. 7, such that the wire 18 is now in the ramming path of the die forming station 16.

Referring now to FIGS. 1 and 9 through 16, there is illustrated a sequential operative step in forming the wire 18 into a trombone paper clip.

Figure 6:
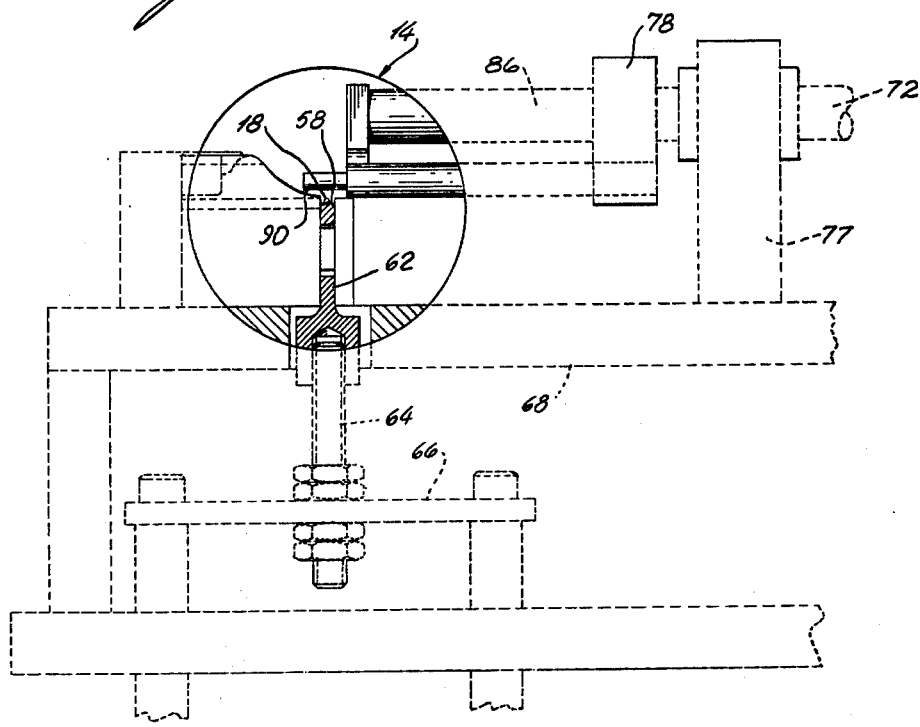
FIG. 6 is a fragmentary schematic view showing a detail in cross-section of the receiving slot and the lifting mechanism and the ramming member.

The station 16 includes a suitable frame on which is mounted bearing block 77. The bearing blocks journal reciprocating shafts 70 and 72. These shafts 70 and 72 are connected to a typical drive means which is not shown. These shafts 70 and 72 are connected to a connecting plate 78 which in turn mounts ramming members 84 and 86, as shown in FIGS. 1 and 6, as well as spindles 90 and 92. Sleeve 82 is also mounted to the connecting member 78 while the concentric fixed spindle 80 is connected directly to the bearing block 77. The ramming members 84 and 86 are fixed to a vertical ramming plate 88. Ramming plate 88 has openings 94, 96 and 98 corresponding to the location of the spindles 80, 90 and 92.

Figure 14:
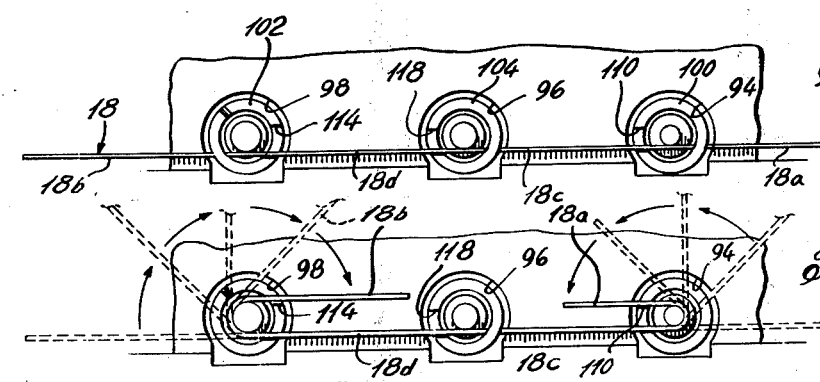
FIG. 14 is a fragmentary schematic elevation showing the cut wire in the ramming path before being engaged by the forming dies.
Figure 15:
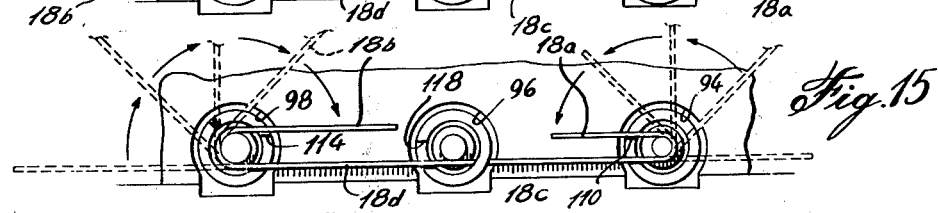
FIG. 15 is a similar view to FIG. 14 showing the cut wire being partially formed by the forming dies.
Figure 16:
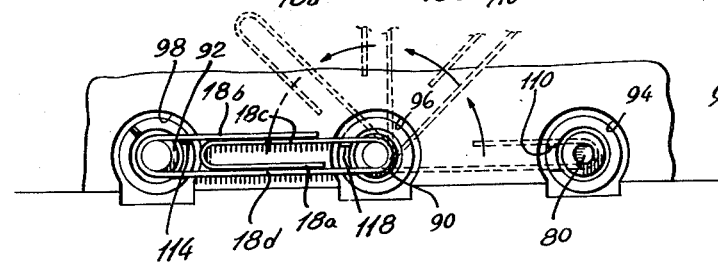
FIG. 16 is a view similar to FIGS. 13 and 14 but showing the paper clip in its final forming stage.

The ramming plate 88 is normally in a position adjacent the receiving station 14, that is, slot 51, and is adapted to engage the wire 18 when the wire 18 is lifted to the ramming path by means of the platform 58. At right angles to the slot 51 are three tubular die members 100, 102 and 104. The die members have a spiral bending edge 108, 112 and 116 respectively and are located corresponding to the sequential bending steps in forming the paper clip. The fixed spindle 80 extends centrally of the tubular die member 100. The sleeve 82, however, advances with the ramming plate 88 and is dimensioned so as to pass concentrically within the tubular die member 100. The spindles 90 and 92 are stepped so that the forward portion of the spindle is of less diameter than the rear portion of the spindle and form a flat shoulder in the plane of the ramming plate 88 as to also push the wire through the bending steps as the spindle passes centrally of the respective die members. Finally, the die members each have a slot 110, 114 and 118 respectively, as shown in FIGS. 14, 15 and 16, these slots allowing the bent wire to pass unobstructed.

Figure 12:
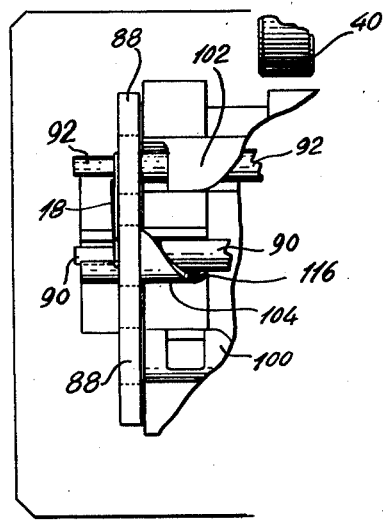
FIG. 12 is a fragmentary top plan view of the forming dies.
Figure 13:
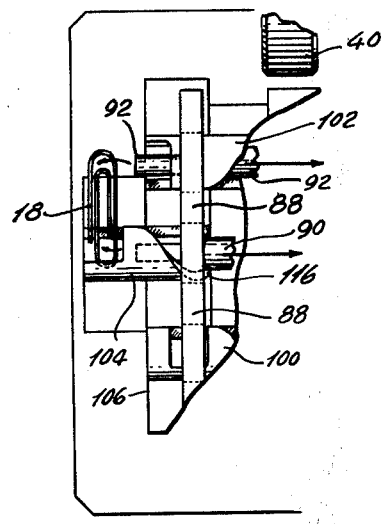
FIG. 13 is a view similar to FIG. 12 showing the completed paper clip being discharged from the forming dies.

In operation, the ramming plate 88 as well as the spindles 90 and 92 and the sleeve 82 advance, pushing the cut wire 18 from the platform 58. The wire portion 18a will first be engaged by the bending spiral edge 108 causing the wire to be bent about the spindle 80. Similarly, the portion 18b of the wire 18 will bend about the spindle 92 by means of the bending edge 112. Both the bent sections 18a and 18b are in a situation as shown in FIG. 15, and they will pass through the slots 110 and 114 as the ramming plate 88 advances the wire to the final die 104. The bending edge 116 will engage the wire 18 causing the section 18c to bend as shown in FIG. 16 to form the paper clip as shown in FIG. 16. The paper clip is further pushed as shown in FIG. 12 to be discharged from the spindles as the whole is retracted as shown in FIG. 13.

I claim:

1. An apparatus for cutting a length of wire from a continuous wire member, including means for advancing the wire at a predetermined speed in a given path, means presenting a die surface adjacent the path of the wire, knife means on the opposite side of the path from said die surface adapted to intermittently engage the wire and press the wire against the die, and partially sever the wire; the knife means engaging the wire at predetermined lengths along the wire as it passes by the die, the knife means including a cutting blade edge for penetrating the wire and a pair of shoulders spaced from the blade edge a distance less than the thickness of the wire such that the shoulders engage and press the cut edges of the wire, and delivery means engaging the wire along the path downstream of the cutting station.

2. An apparatus as defined in claim 1, wherein the knife means includes a driven wheel, and at least two diametrically oppositely located cutting knives on the wheel extending radially of the wheel and adapted to engage the wire against the die surface.

3. An apparatus for use in a wire forming machine, the apparatus including a receiving slot for receiving and aligning a length of wire, the slot being provided in a feeding path of the wire wherein the wire arrives in the slot at high speeds, the slot including a pair of side walls defining the slot, a deflecting member on one of the pair of side walls in the slot, the surface of the deflecting member being at an acute angle to the path of the wire, and the trailing edge of the deflecting surface being spaced from the other of the pair of side walls a distance greater than the diameter of the wire, such that as the wire is delivered at high speeds into the slot, the wire hits the deflecting surface and passes through the space between the trailing edge of the deflecting surface and the opposite wall forming the slot, at a reduced speed as a result of said deflection, and a magnet located at the closed end of said receiving slot so as to retain the wire and hold it against the magnet surface in a position properly located in the slot, said slot being provided with a bottom platform movable in a vertical direction so as to lift the cut wire out of the slot.

4. An apparatus as defined in claim 3, wherein the platform is mounted to a pedestal which in turn is supported by a piston means connected to a lifting mechanism.

5. An apparatus for forming a trombone paper clip from a cut piece of wire, including a ramming member for advancing a cut wire sideways along a ramming path, said means including a ramming plate, three tubular forming dies having spirally curved bending edges with the respective axes being at right angles to the wire and the ramming member, the ramming member including forwardly projecting spindles adapted to pass centrally of the respective tubular forming dies and adapted to engage the cut wire member and advance the wire with the ramming plate through the forming dies while the forming dies form the wire into a trombone paper clip and the ramming member being adapted to discharge the formed paper clip from the forming dies.

6. An apparatus as defined in claim 5, wherein the ramming member includes a connecting plate mounted on reciprocating members, the connecting plate mounting the ramming member and spaced-apart spindles and the ramming plate, the ramming plate defining openings surrounding the spindles, the openings being greater than the dimensions of the forming dies, the spindles including flat radial shoulders and axially projecting portions serving as mandrels for the wire being bent, and at least a further spindle fixed to the frame and extending through a sleeve and through the respective die member, the sleeve being connected to the connecting plate.

7. An apparatus for forming a paper clip comprising means for advancing a continuous wire at a predetermined feed speed in a given path, means presenting a die surface adjacent the path of the wire, knife means on the opposite side of said path from said die surface adapted to intermittently engage the wire, pressing the wire against the die and partially severing the wire, the knife means engaging the wire at predetermined lengths along the wire as it passes by the die, the knife means including a cutting blade edge for penetrating the wire and a pair of shoulders spaced from the blade edge a distance less than the thickness of the wire such that the shoulders engage and press the cut edges of the wire, and delivery means engaging the wire along the path downstream of the cutting station, said delivery means advancing the wire at a speed greater than the feeding means, whereby the wire is being pulled while it is being partially severed to thereby separate the length of wire, said delivery means delivering the wire into a receiving slot at high speeds, the receiving slot being arranged to align the wire to be passed through a die forming means, a deflecting member in the slot, the surface of the deflecting member being at an acute angle to the path of the wire, and the trailing edge of the deflecting surface being spaced from an opposite surface, forming the slot, a distance greater than the diameter of the wire, such that as the wire is delivered at high speed into the slot, the wire hits the deflecting surface and passes through the space between the trailing edge of the deflecting surface and the wall forming the slot at a reduced speed as a result of said deflection, and a magnet located at the closed end of said receiving slot so as to retain the wire and hold it against the magnet surface in a position ready to be passed through the die forming means, means for lifting the wire out of said receiving slot into a ramming path, three tubular forming dies having spirally curved bending edges, the axes of said forming dies being at right angles to the receiving slot, a ramming member including forwardly projecting spindles adapted to pass centrally of the respective tubular forming dies and adapted to engage the cut wire member lifted from the receiving slot into the ramming path and advance the wire through the forming dies while the forming dies form the wire into a trombone paper clip and the ramming member being adapted to discharge the formed paper clip from the forming dies.

* * * * *